UNITED STATES PATENT OFFICE.

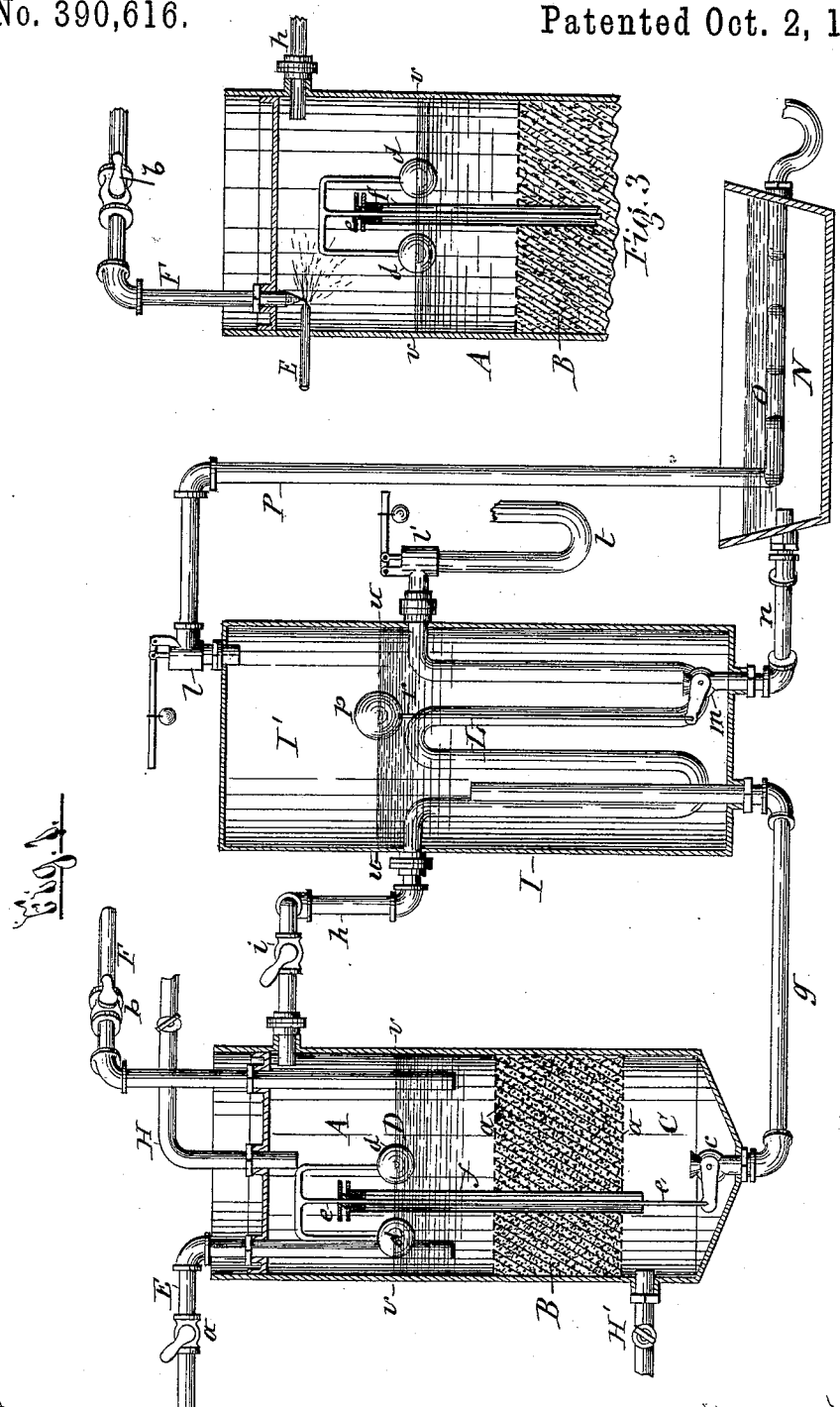

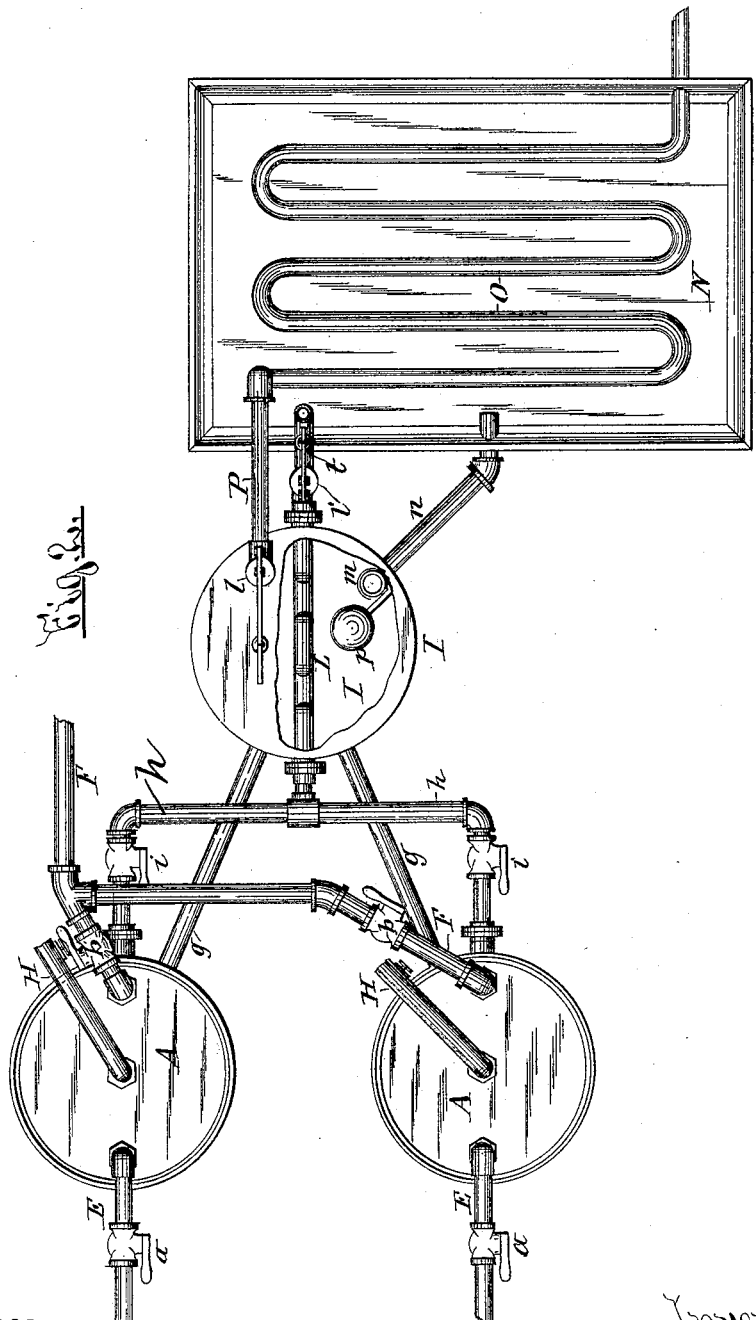

GEORGE A. PORTER, OF SYRACUSE, NEW YORK.

APPARATUS FOR PURIFYING AND EVAPORATING SALINE LIQUIDS.

SPECIFICATION forming part of Letters Patent No. 390,616, dated October 2, 1888.

Application filed November 24, 1886. Serial No. 219,759. (No model.)

*To all whom it may concern:*

Be it known that I, GEORGE A. PORTER, of Syracuse, in the county of Onondaga, in the State of New York, have invented new and useful Improvements in Apparatus for Purifying and Evaporating Saline Liquids, of which the following, taken in connection with the accompanying drawings, is a full, clear, and exact description.

This invention relates to the purification and evaporation of liquids by artificial heat, and has more particularly reference to the treatment of natural brine preparatory to reducing the same to salt.

It is a well-known fact that natural brine is more or less contaminated by foreign ingredients, which, if allowed to remain in the brine during its reduction to salt, greatly impair the quality and commercial value of the salt. Various devices have been resorted to to eliminate the impurities from the brine; but they have almost invariably proved failures, owing to the incrustation and clogging of the pipes and vessels of the purifying apparatus by the adhesion of the impurities to the same.

The object of my invention is to obviate the aforesaid difficulties of the prior purifying apparatus and to provide an apparatus which shall regulate itself automatically and purify the brine in a thorough and economical manner; and to that end my invention consists in the improved means for purifying the brine, as hereinafter described, and specifically set forth in the claims.

In the annexed drawings, Figure 1 is a vertical transverse section of an apparatus embodying my invention. Fig. 2 is a plan view of the same, and Fig. 3 is a vertical sectional view illustrating the arrangement for atomizing the brine at its ingress to the filtering-tank.

Similar letters of reference indicate corresponding parts.

A represents a steam-tight tank placed in an upright position. In said tank, and preferably a short distance above the bottom thereof, is arranged a filter-section, B, consisting of diaphragms *a a* and a packing of sand or other suitable and well-known filtering material between said diaphragms. The space C underneath the filter-section B is left for the reception of the filtered liquid or brine. A much larger steam and water space, D, is left between the top of the filter-section B and top of the tank, and into this latter space, and preferably through the top of the tank, project a steam-induction pipe, E, and a brine-induction pipe, F. The said steam-pipe is to be connected with a suitable steam-generator to conduct live steam to the tank A. Said steam I prefer to have superheated or as dry as possible, as this greatly promotes the desired effect. The brine is to be forced through the pipe F by means of a force-pump to counteract the pressure of the steam introduced into the tank A. The ends of the pipes E and F may be extended far enough down in the tank to maintain the mouths of the pipes immersed in the liquid in the space D, as shown in Fig. 1 of the drawings. I prefer, however, to terminate said pipes above the water-line *v v* of the tank A, and with the ends of the pipes in proximity to each other and axially at right angles, as shown in Fig. 3 of the drawings, so as to cause the steam issuing from one pipe to atomize the brine issuing from the other pipe in the manner described in the patent to Thomas G. Walker, No. 337,900, dated March 16, 1886, as I believe this to be the most economical and most effective manner of bringing the impurities into a suitable condition for eliminating them from the brine by filtration.

It is deemed advisable to employ two or more filtering-tanks, A, each equipped in the manner hereinbefore described, so as to permit of always bringing one of them into use while repairing or cleaning the other.

The steam-pipe E and brine-pipe F of each filtering-tank A are provided with stop-cocks *a* and *b*, by means of which the steam and brine can be excluded from the filtering-tank requiring repairs or cleaning. Two other pipes, H and H', tap, respectively, the top and base of the tank A, and are provided with suitable stop-cocks. The function of these latter pipes is simply to cleanse the filter when required, the cleansing being accomplished by closing the stop-cocks *a* and *b* and the discharge-cock *c*, hereinafter described, and opening the stop-cocks of the pipes H H' and forcing a stream of clean water through the lower pipe, H', into the tank, the water being thus forced upward through the tank and out through the upper pipe, H, and in its penetration through the filter-section B it cleanses the same and ejects the impurities through the pipe H. The stop-cocks of the pipes H H' are to be closed after the aforesaid cleansing process, and then the stop-cocks a b may be opened to admit steam and brine into the tank.

c denotes the discharge-cock, which may be connected to the base of the tank A in any suitable manner; but I prefer to locate it in the water-space C and place in the steam and water space D a float or floats, d, which I connect with the valve of the discharge-cock c by a rod, e, passing longitudinally through a pipe, f, which is extended vertically through the filter-section B and above the water-line of the upper space, D, and is to be either properly packed or provided with a stuffing-box to prevent the steam from passing from the upper part of the tank down through the aforesaid pipe f to the base of the tank; otherwise the pressure of the steam would be equalized throughout the tank and the filtration would be deprived of the downward pressure of the steam.

I represents a steam-boiler of any suitable shape, and g is a pipe extended from the stop-cock c into the boiler I to conduct the purified brine from the tank A to said boiler. The contents of the boiler I are heated by means of a suitable steam-heater, L, which may be either in the form of a steam-jacket surrounding the boiler-shell or consist of a steam-pipe extended in a tortuous course through the boiler, as shown. A pipe, h, is extended from the upper part of each tank A and united with that of the other tank, and the united pipes are connected with the heater L to conduct to the latter the necessary steam to heat the same. Each individual pipe h is provided with a stop-cock, i, to permit of closing the steam communication between the heater L and the tank A when desired to cool the same for repairing or cleaning. The opposite end of the heater L is extended through the boiler-shell and provided or formed with a suitable trap, t, to collect the water of condensation, which water may be returned to the steam-generator by any suitable and well-known means. To the aforesaid heater L, I attach a suitable safety-valve, l', which can be adjusted to resist with any desired degree the escape of steam from said heater and thus regulate the steam-pressure in said heater and in the tank A. The heater L occupies the lower and central portions of the boiler I, leaving a steam and water space, I', above the pipe.

N represents the final evaporator or grainer, which may be of any suitable shape adapted for the purpose—preferably of the form of a vat having inclined sides to allow the salt to be scraped out of the vat. This grainer is heated by a suitable steam-heater, O, represented in the form of a steam-pipe arranged in a serpentine or tortuous course inside of said grainer and receiving steam through a pipe, P, extended from the top of the boiler I and connected with the heater O. The flow of steam from the boiler I to the heater O of the grainer and the pressure of the steam in said boiler are controlled automatically by means of a safety-valve, l, connected to the boiler and having the pipe P connected to it above the valve.

In the base of the boiler is located a discharge-cock, m, to which is connected a pipe, n, which is extended into the grainer to deliver the heated brine therein.

In the upper part of the boiler I place float p, which I connect with the valve of the discharge-cock m by means of a rod, r, in such a manner as to cause said valve to be opened and closed automatically by the rise and fall of the float.

The operation of my invention is as follows: The stop-cock b is opened and the pump (not shown) started to force the crude brine into the tank A, and simultaneously with the introduction of the brine the stop-cock a is opened to allow the steam to enter the aforesaid tank. The brine in the tank is thus heated and subjected to pressure, and in this condition it passes through the filtering-section B down to the bottom of the tank. When the brine in the tank rises above water-line v v, it lifts the float or floats d, and thereby opens the discharge-cock c and allows the filtered brine to pass into the boiler I. In the meantime steam passes from the upper part of the tank A through the pipe h and into the heater L, which is thereby heated, and thus the brine is reheated in the boiler and brought to saturation. The escape of the steam from the heater L is arrested by the safety-valve l, which is to be adjusted to resist the desired pressure of steam, so as to produce the proper heat and pressure in the said heater and in the filtering-tank, and yet render them perfectly safe from excessive pressure and explosion. As the brine rises above the water-line u u in the boiler, the float p rises with the brine and opens the discharge-cock m by the connecting-rod r. The reheated brine then flows through the pipe n into the grainer N. The safety-valve l is to be so regulated as to open under the desired pressure of steam in the boiler I, and said steam, passing through the heater O, heats and evaporates the brine in the grainer.

It will be observed that in the described apparatus the crude brine is subjected to heat and pressure in the tank A and while passing through the filter. This heat and pressure cause the impurities to be brought from a state of solution to a state of suspension, and in the latter state the impurities are eliminated from the brine by the immediate filtration.

It will also be observed that by my improved apparatus no heated crude brine is conducted through pipes, and consequently the clogging of pipes by incrustations is obviated, and this important improvement, together with the employment of safety-valves for controlling the pressure of the steam in the filtering-tank, boiler or saturating-tank, and steam-pipes of the apparatus, renders the apparatus perfectly secure against explosion. Furthermore, the process is conducted in a most inexpensive manner, inasmuch as the flow of brine and steam through the apparatus is regulated automatically and requires no special care of the person in charge of the apparatus after it has been set into operation.

Having described my invention, what I claim as new, and desire to secure by Letters Patent, is—

1. The within-described safety-filter, consisting of a steam tight tank, a filter-section in said tank, liquid-induction and steam-induction pipes communicating with the tank above the filter-section, a discharge-cock at the base of the tank, a safety-valve for controlling the steam-pressure in the tank, and a float connected with the valve of the discharge-cock for automatically opening and closing the same, as set forth.

2. In combination with a boiler, a steam-tight filtering-tank having a steam and water space above the filtering-section, steam-induction and liquid-induction pipes communicating with the upper part of said tank, a discharge-cock at the base of the tank, a float in the upper part of the tank, a rod connecting the float with the valve of the discharge-cock, a pipe leading from the latter to the interior of the boiler, and the steam-pipes $h$ and L, extending from the upper part of the filtering-tank through the boiler to heat the latter, substantially as described and shown.

3. The within-described automatically-controlled liquid purifying and evaporating apparatus, consisting of a steam-tight tank having a filter-section therein, with a steam and liquid space above said filter-section, a steam-induction pipe and liquid-induction pipe communicating with the said steam and liquid space, a discharge-cock connected with the base of said tank, a float in the upper part of the tank, a rod connecting the float with the valve of the discharge-cock, a boiler, a pipe leading from the discharge-cock into the boiler, a steam-heater connected with said boiler to heat the contents thereof, a safety-valve attached to said heater, a safety-valve attached to the boiler, a grainer, a steam-heater in said grainer, a steam-pipe extended from the safety-valve of the boiler to the heater of the grainer, a discharge-cock connected with the base of the boiler, a float in said boiler, a rod connecting said float with the valve of the discharge-cock, and a pipe leading from the discharge-cock of the boiler into the grainer, all combined to operate substantially in the manner specified.

In testimony whereof I have hereunto signed my name and affixed my seal, in the presence of two attesting witnesses, at Syracuse, in the county of Onondaga, in the State of New York, this 20th day of November, 1886.

GEORGE A. PORTER. [L. S.]

Witnesses:
HOWARD PERCY DENISON,
C. BENDIXON.